(12) United States Patent
Constantinides

(10) Patent No.: US 11,436,619 B2
(45) Date of Patent: Sep. 6, 2022

(54) REAL TIME GEO-SOCIAL VISUALIZATION PLATFORM

(71) Applicant: You Map Inc., Baltimore, MD (US)

(72) Inventor: Stephen Constantinides, New York, NY (US)

(73) Assignee: You Map Inc., Baltimore, MD (US)

( * ) Notice: Subject to any disclaimer, the term of this patent is extended or adjusted under 35 U.S.C. 154(b) by 134 days.

(21) Appl. No.: 15/189,691

(22) Filed: Jun. 22, 2016

(65) Prior Publication Data

US 2018/0069817 A1     Mar. 8, 2018

Related U.S. Application Data

(60) Provisional application No. 62/183,068, filed on Jun. 22, 2015.

(51) Int. Cl.
| | | |
|---|---|---|
| *G06Q 30/02* | (2012.01) | |
| *H04L 51/222* | (2022.01) | |
| *H04L 67/306* | (2022.01) | |
| *G06Q 50/00* | (2012.01) | |
| *H04W 4/02* | (2018.01) | |
| *H04L 67/52* | (2022.01) | |
| *H04L 51/52* | (2022.01) | |

(52) U.S. Cl.
CPC ......... *G06Q 30/0205* (2013.01); *G06Q 50/01* (2013.01); *H04L 51/20* (2013.01); *H04L 67/18* (2013.01); *H04L 67/306* (2013.01); *H04W 4/023* (2013.01); *H04L 51/32* (2013.01)

(58) Field of Classification Search
CPC ........ G06Q 10/00; G06Q 30/02; G06Q 10/06; G06Q 30/0205; G06Q 50/01; H04W 4/023

USPC ............................................... 705/7.11–7.42
See application file for complete search history.

(56) References Cited

U.S. PATENT DOCUMENTS

| | | | |
|---|---|---|---|
| 8,606,792 B1 | 12/2013 | Jackson et al. | |
| 8,738,039 B2 * | 5/2014 | Forstall ............ | H04M 1/72572 |
| | | | 455/414.3 |
| 8,788,973 B2 | 7/2014 | Lavigne et al. | |
| 9,183,807 B2 | 11/2015 | Small et al. | |
| 9,509,787 B2 | 11/2016 | Li | |

(Continued)

FOREIGN PATENT DOCUMENTS

| | | |
|---|---|---|
| KR | 102016007870 | 7/2016 |
| WO | 2015021200 A1 | 2/2015 |
| WO | 2017120660 A1 | 7/2017 |

OTHER PUBLICATIONS

Cardone et al., The ParticipAct Mobile Crowd Sensing Living Lab: The Testbed for Smart Cities, Oct. 24, 2014, IEEE Communications Magazine (vol. 52, Issue 10), pp. 78-85 (Year: 2014).*

(Continued)

*Primary Examiner* — Robert D Rines
(74) *Attorney, Agent, or Firm* — Redbrick IP, P.C.

(57) ABSTRACT

A real-time social and emotional mapping system enabling the visualization of state data in a geo-locational context, including goals, intentions, feelings, observations, and physical states, among others, in a-location based context visualized as a digital map. A structured framework may enables users to share state data by selection or guided entry of data or alternatively through some classification of submitted data. In embodiments, an integrated request-response framework is provided through a marketplace centered on geo-locational context.

17 Claims, 5 Drawing Sheets

Figure 3.

(56) References Cited

U.S. PATENT DOCUMENTS

| | | | |
|---|---|---|---|
| 9,613,003 B1 | 4/2017 | Goodspeed | |
| 9,633,695 B2 | 4/2017 | Axen et al. | |
| 9,712,587 B1* | 7/2017 | Alfishawi | G06Q 30/0269 |
| 9,715,482 B1 | 7/2017 | Bjorkegren | |
| 9,826,345 B2 | 11/2017 | Haro et al. | |
| 10,387,574 B1 | 8/2019 | Anders et al. | |
| 2007/0147654 A1 | 6/2007 | Clatworthy et al. | |
| 2007/0226063 A1 | 9/2007 | Hanson | |
| 2008/0215994 A1 | 9/2008 | Harrison et al. | |
| 2008/0222295 A1 | 9/2008 | Robinson et al. | |
| 2008/0288406 A1* | 11/2008 | Seguin | G06Q 30/02 705/50 |
| 2010/0131366 A1* | 5/2010 | Gibson | G06Q 30/02 705/14.58 |
| 2010/0164957 A1 | 7/2010 | Lindsay et al. | |
| 2010/0180029 A1* | 7/2010 | Fourman | G06F 17/30867 709/225 |
| 2010/0305855 A1 | 12/2010 | Dutton et al. | |
| 2011/0238755 A1 | 9/2011 | Khan et al. | |
| 2011/0238762 A1 | 9/2011 | Soni et al. | |
| 2011/0238763 A1 | 9/2011 | Shin et al. | |
| 2011/0246910 A1 | 10/2011 | Moxley et al. | |
| 2012/0135784 A1 | 5/2012 | Lee et al. | |
| 2012/0143963 A1 | 6/2012 | Kennberg et al. | |
| 2013/0060873 A1 | 3/2013 | Gautam et al. | |
| 2013/0066963 A1* | 3/2013 | Odio | H04L 65/403 709/204 |
| 2013/0072235 A1* | 3/2013 | Forstall | H04M 1/72457 455/456.3 |
| 2013/0073387 A1* | 3/2013 | Heath | G06Q 50/01 705/14.53 |
| 2013/0073970 A1 | 3/2013 | Piantino et al. | |
| 2013/0080922 A1 | 3/2013 | Elias et al. | |
| 2013/0110631 A1* | 5/2013 | Mitchell | H04W 4/185 705/14.58 |
| 2013/0139070 A1 | 5/2013 | Baldwin et al. | |
| 2013/0196690 A1 | 8/2013 | Crowley et al. | |
| 2013/0198661 A1 | 8/2013 | Matas | |
| 2013/0201185 A1 | 8/2013 | Kochi | |
| 2013/0232011 A1* | 9/2013 | Gupta | G06Q 30/02 705/14.64 |
| 2013/0242262 A1 | 9/2013 | Lewis | |
| 2013/0321390 A1 | 12/2013 | Latta et al. | |
| 2014/0002442 A1 | 1/2014 | Lamb et al. | |
| 2014/0046591 A1 | 2/2014 | Boldyrev et al. | |
| 2014/0101601 A1* | 4/2014 | Tang | G06F 17/30241 715/781 |
| 2014/0181193 A1 | 6/2014 | Narasimhan | |
| 2014/0236882 A1* | 8/2014 | Rishe | G06F 16/29 706/50 |
| 2014/0250200 A1* | 9/2014 | Geurts | H04L 51/10 709/206 |
| 2014/0274564 A1 | 9/2014 | Greenbaum | |
| 2014/0280278 A1* | 9/2014 | Harris | G06F 16/95 707/758 |
| 2014/0316192 A1 | 10/2014 | Massimiliano et al. | |
| 2014/0316691 A1* | 10/2014 | Ren | G01C 21/3667 701/409 |
| 2014/0359537 A1* | 12/2014 | Jackobson | G06Q 30/0261 715/855 |
| 2015/0032766 A1 | 1/2015 | Greenbaum | |
| 2015/0039443 A1* | 2/2015 | Soon-Shiong | G06Q 30/0269 705/14.66 |
| 2015/0058255 A1 | 2/2015 | Cork | |
| 2015/0061825 A1 | 3/2015 | Suzuki et al. | |
| 2015/0169142 A1* | 6/2015 | Longo | H04L 67/18 715/751 |
| 2015/0220802 A1 | 8/2015 | Mazur et al. | |
| 2015/0245168 A1* | 8/2015 | Martin | H04W 4/02 715/751 |
| 2015/0262208 A1* | 9/2015 | Bjontegard | G06Q 30/0205 705/7.31 |
| 2015/0302651 A1 | 10/2015 | Shpigelman | |
| 2015/0310497 A1 | 10/2015 | Valin et al. | |
| 2015/0325226 A1 | 11/2015 | Rosedale et al. | |
| 2015/0334077 A1 | 11/2015 | Feldman | |
| 2015/0378587 A1 | 12/2015 | Falaki et al. | |
| 2016/0019661 A1* | 1/2016 | Bouganim | G06Q 50/01 705/319 |
| 2016/0027329 A1 | 1/2016 | Jerauld | |
| 2016/0029368 A1* | 1/2016 | Borenstein | H04W 72/048 709/205 |
| 2016/0055250 A1 | 2/2016 | Rush | |
| 2016/0080438 A1 | 3/2016 | Liang | |
| 2016/0142894 A1* | 5/2016 | Papakonstantinou | G16H 50/30 455/404.1 |
| 2016/0169696 A1 | 6/2016 | Butts et al. | |
| 2016/0171582 A1 | 6/2016 | Linden | |
| 2016/0203223 A1 | 7/2016 | Hladik, Jr. | |
| 2016/0232131 A1* | 8/2016 | Liu | G06Q 10/06 |
| 2017/0109807 A1 | 4/2017 | Krishnan | |
| 2017/0127128 A1 | 5/2017 | Seger | |
| 2017/0134508 A1 | 5/2017 | Kalis et al. | |
| 2017/0139207 A1 | 5/2017 | Jenabzadeh | |
| 2017/0193075 A1 | 7/2017 | Hegelich et al. | |
| 2017/0200296 A1 | 7/2017 | Jones et al. | |
| 2017/0220966 A1 | 8/2017 | Wang | |
| 2017/0270821 A1 | 9/2017 | Jerauld | |
| 2017/0295127 A1 | 10/2017 | He | |
| 2018/0004762 A1 | 1/2018 | Jazayeri | |
| 2018/0006993 A1 | 1/2018 | Jazayeri | |
| 2018/0060778 A1 | 3/2018 | Guo et al. | |
| 2018/0121029 A1 | 5/2018 | Mrad et al. | |
| 2018/0293308 A1 | 10/2018 | Miller et al. | |
| 2020/0242182 A1 | 7/2020 | Gokyigit | |

OTHER PUBLICATIONS

Behzadan, A. et al., 2012. A Framework for Utilizing Context-Aware Augmented Reality Visualization in Engineering Education, 12th International Conference on Construction Application of Virtual Reality, Taipei, Taiwan, 292-299.

Dias, A., 2009. Technology Enhanced Learning and Augmented Reality: An Application on Multimedia Interactive Books, International Business & Economics Review, vol. 1, n.1.

International Search Report and Written Opinion received in PCT/US18/42169, dated Sep. 24, 2018 (10 pages).

International Search Report and Written Opinion received in PCT/US18/42355, dated Oct. 1, 2018 (10 pages).

Shirazi, A., 2014. Context-Aware Mobile Augmented Reality Visualization in Construction Engineering Education, Electronic Theses and Dissertations, University of Central Florida. Paper 4510.

Specht, M. et al., 2011. Mobile Augmented Reality for Learning: A Case Study. Journal Of The Research Center For Educational Technology, 7(1). Retrieved Jan. 18, 2012, from http://www.rcetj.org/index.php/rcetj/article/view/151.

J. A. B. Perera, D. Zhang and M. Lu, "Smart Maps through Semantic Web, Social Media, and Sentiment Analysis," 2015 IEEE International Conference on Information Reuse and Integration, San Francisco, CA, 2015, pp. 49-56, doi: 10.1109/IRI.2015.18. (Year: 2015).

R. Wang et al., "Taxi Rec: Recommending Road Clusters to Taxi Drivers Using Ranking-Based Extreme Learning Machines," in IEEE Transactions on Knowledge and Data Engineering, vol. 30, No. 3, pp. 585-598, Mar. 1, 2018, doi:10.1109/TKDE 2017. 2772907. (Year: 2018).

D. Widdows, J. Lucas, M. Tang and W. Wu, "GrabShare: The construction of a realtime ridesharing service," 2017 2nd IEEE International Conference on Intelligent Transportation Engineering (ICITE), 2017, pp. 138-143, doi: 10.1109 ICITE.2017.8056896. (Year: 2017).

I. Cho, R. Wesslen, S. Volkova, W. Ribarsky and W. Dou, "CrystalBall: A Visual Analytic System for Future Event Discovery and Analysis from Social Media Data," 2017 IEEE Conference on Visual Analytics Science and Technology (VAST), 2017, pp. 25-35, doi: 10.1109NAST. 2017.8585658 (Year: 2017).

(56) References Cited

OTHER PUBLICATIONS

Y. Tian, W. Wei, Q. Li, F. Xu and S. Zhong, "MobiCrowd: Mobile Crowdsourcing on Location-based Social Networks," IEEE INFOCOM 2018—IEEE Conference on Computer Communications, Honolulu, HI, USA, 2018, pp. 2726-2734, doi: 10.1109/ INFOCOM.2018. 8486433. (Year: 2018).

J. Jiang, H. Lu, B. Yang and B. Cui, ""Finding top-k local users in geo-tagged social media data,"" 2015 IEEE 31st International Conference on Data Engineering, 2015, pp. 267-278, doi: 10.1109/ ICDE 2015.7113290 (Year: 2015).

R. Rizia, M. Tanviruzzaman and S. I. Ahamed, ""KnockAround: Location Based Service via Social Knowledge,"" 2012 IEEE 36th Annual Computer Software and Applications Conference, 2012, pp. 623-631, doi: 10.1109/COMPSAC.2012.88. (Year: 2012).

X. Liang, K. Zhang, R. Lu, X. Lin and X. Shen, ""EPS: An Efficient and Privacy-Preserving Service Searching Scheme for Smart Community,"" in IEEE Sensors Journal, vol. 13, No. 10, pp. 3702-3710, Oct. 2013, doi: 10.1109/JSEN.2013.2263793. (Year: 2013).

\* cited by examiner

REAL TIME GEO-SOCIAL VISUALIZATION PLATFORM

PRIORITY CLAIM

This application claims priority to U.S. Patent Application No. 62/183,068, filed Jun. 22, 2015 and titled, "REAL TIME GEO-SOCIAL VISUALIZATION PLATFORM," the contents of which is incorporated by reference in its entirety.

BACKGROUND

Social media has grown to a multi-billion-dollar industry from the inherent desire of many people to share their lives with others. The need for human connection is a driving force behind social networking, making sites such as Facebook, LinkedIn, and Instagram among the most popular destinations on the Internet, a trend that continues to grow.

The mobile devices utilized to interact with social media have become omnipresent and miniaturization of these devices and their embedded sensors has increased the abilities of these devices to read not only our location, but also our physical—and even mental—states. These devices are constant companions providing us access to a global connected network at a moment's notice, at the very time our life experiences occur, and at the very time observation and subjective experience meet. Access to online social networks is no longer limited to the home.

The advent of wearable computers, including augmented reality glasses, smart watches, and other wearable devices, has enabled individuals to truly be present at the "point of experience," the place and time human observations, experiences, and emotions occur.

The common concept of a "feed," while useful to represent time, does not correctly represent our human existence. Unlike a social media "feed," we live in a three-dimensional physical world, one in which we move, socialize, and experience, all in the context of location. While some mapping solutions have emerged that take advantage of user mobility, most attempts have been limited in their scope and their ability to take advantage of point-of-experience immediacy. There is thus a need for a system that enables users or groups of users to share and relate and learn about each other's lives, in real time, on location, and as it happens.

The term "social network" reflects both our emotional humanity and the manner in which observation and experience occurs. Most social networks make their users the guiding philosophy around which everything else revolves, namely, the activities of your social media contacts, celebrities, or other popular users. While popularity can be a useful tool of organization within a system, there is a risk that excessive focus on popularity may prevent social networking from becoming a greater tool for social change.

Currently the industry is not making best use of the point of experience and immediacy that smart phone devices enable. The prior art has hardly touched the surface of what is possible.

Some applications, such as Waze, have understood the benefits of such an approach, providing a structured if limited way to share specific information, in the case of Waze, traffic reporting, Waze for example includes a quick action menu allowing users to quickly report road related conditions. This includes "traffic" "road work" "cop" and other events that prove useful to users on the road. Our system diverges from this limited system by giving the control to users to create their own channels, assign their own selection options useful to the purpose of the channel.

Using a map interface to provide context to real time state data and or multimedia data as might be captured through sensors or input devices is a rethinking of the live stream, news broadcasting and social media.

The real time mapping based context that follows user locations minute to minute provides an immediate and concrete ability to know what is happening, exactly where it is happening, the emotional and physical resonance of events.

BRIEF DESCRIPTION OF THE DRAWINGS

The features and advantages of the present disclosure will be more fully understood with reference to the following detailed description when taken in conjunction with the accompanying figures, wherein.

SUMMARY

Figure 1:
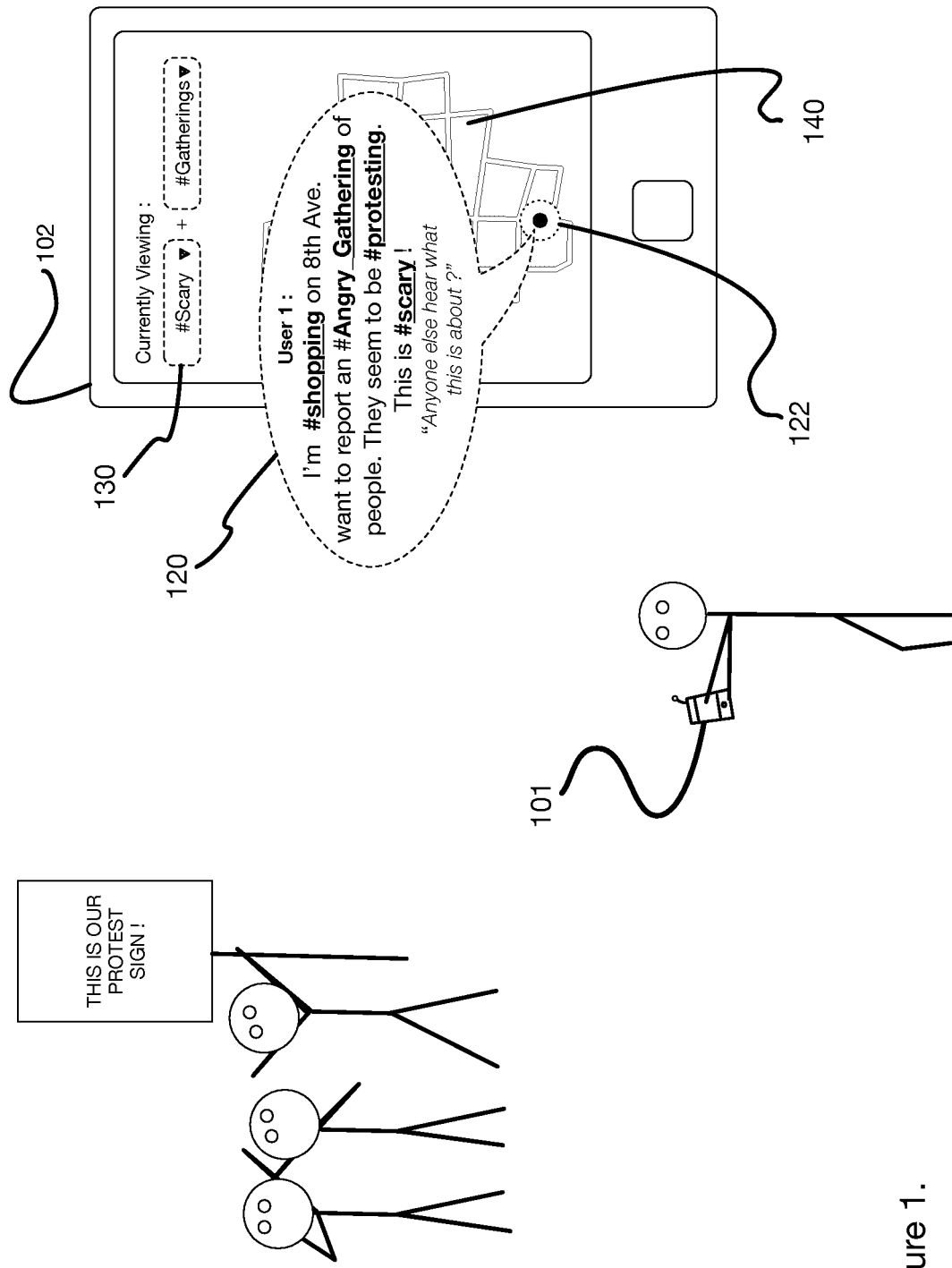
FIG. 1 is a depiction of a client device being used to send observational state data to a receiving client, with the observational date being displayed in a locational context.

In some embodiments, a system for rendering and displaying data in a geo-locational context may include a memory to store executable instructions and/or a processor coupled to the memory. In some embodiments, the processor, responsive to executing the executable instructions, performs operations may include receiving state data and at least one submission methodology from at least one client device over a network connection; processing the state data processing according to preset criteria to generate processed dataset; transmitting the processed dataset to at least one client device, and receiving from the at least one client device; and/or causing the refined dataset to be displayed on the at least one client device in a geo-locational context.

In some embodiments, the processing may include supplemental data. In some embodiments, requests to refine the dataset within the parameters a set by the submission methodology and refining the processed dataset to generate a refined dataset. In some embodiments, the preset criteria may include one of statistical analysis and data aggregation.

In some embodiments, the parameters a set by the submission methodology may include a visual overlay representing a portion of the state data, and visual overlay may include density, hue, saturation, pattern, size, texture, opacity, and shape, In some embodiments, the state data may be active state data or passive state data, and may include a user's observations, physical state, data collected by sensors, a user's mental state. In some embodiments, the supplemental data may include estate data gathered from other system users, databases, and/or external networks.

In some embodiments, the submission methodology may use a sentence structure, or may use one of hashtags, autocomplete, option selection, natural language, or dropdown selection.

In some embodiments, a system for providing a geo-locational services marketplace may include a memory to store executable instructions and/or a processor coupled to the memory. In some embodiments, the processor, responsive to executing the executable instructions, performs operations may include receiving service request data from a service provider; processing the service request data according to preset criteria and adding it to a service request dataset; transmitting, in response to a user request, at least a subset of the service request dataset and causing the subset of the service request dataset to be displayed on the at least one client device; enabling a user to filter results based upon predetermined submission methodology; and/or receiving from the user a response to the service request.

In some embodiments, a computer-readable storage device may include computer instructions which, responsive to may be executed by a processor of a mobility management entity, cause the processor to perform operations may include receiving state data and at least one submission methodology from at least one client device over a network connection; processing the state data processing according to preset criteria to generate processed dataset; transmitting the processed dataset to at least one client device, and receiving from the at least one client device; and/or causing the refined dataset to be displayed on the at least one client device in a geo-locational context.

DETAILED DESCRIPTION

In embodiments of the invention, a real-time social and emotional mapping system is disclosed which enables the visualization of state data in a geo-locational context. A structured framework is disclosed in which a plurality of user states may be disclosed, comprising goals, intentions, feelings, observations, and physical states, among others, in real-time, in a-location based context that aligns and resembles the three-dimensional world. In embodiments, the system relies on the user's point of experience or "POE."

In embodiments, POE encompasses several elements namely, structure, simplicity, openness, and immediacy. Structure guides the kinds of data submitted by users or retrieved by users. Openness refers to a system not limited to check-ins but with a rich and open framework of posting. Messages and location may be shared with the entire network and providing a way for users to request information from other users. Simplicity makes the sharing of observational data as seamless and simple as possible. Immediacy makes data available at the time it is needed.

In embodiments the inventive system may run on one or more computing devices, including but not limited to mobile phones, tablets and other portable devices, laptops, computers and wearable computing devices and other client devices with a means of processing, storing data such as a mobile smart phone or laptop.

In embodiments, the system may work across a network of such devices, and each device may be able to communicate with the larger network. Information changed on one device is relayed and displayed, producing changes on other devices. In embodiments, this system may operate on hundreds—if not thousands—of client devices, each connected remotely to a central server. Information input in one device and subsequently output results on other devices and devices may communicate both with and without direct human intervention.

In embodiments, this system describes the gathering, analysis and visualization of a plurality of human states consisting of at least one of: (1) a user's sensed observations; (2) a user's physical state or bodily signals; (3) captured supplementary data from sensors or input devices; or (4) a user's mental state comprising emotions, current aims, goals, observations and other thought processes including the perceptions of the thought processes of others.

In embodiments, a structured framework is provided for submitting this data by providing a mechanism whereby users may share state data by selection or guided entry of data or alternatively through some classification of submitted data. By enabling users to post about any topic the means by which people share information may be changed and the usefulness of the resulting knowledge improved. Vastly broadening the kinds and topic of data provided and the portion of the network who will receive the data may change the entire premise of what is possible using mapping as a construct for a social network.

While the "friends list" or "connections" model used by conventional social networks has its utility in certain contexts, it may be limiting when used as the guiding structure of a mapping system. In embodiments, the system of the present invention goes beyond an organizational structure based on previously-built relationships, and focuses on relationships that are built to fill the need for information, connecting those with the need for information with those that possess that information. Just as users of a search engine may search for relevant information and receive relevant results, the system of the present invention may be viewed equally as a tool for searching information, but through the use of on the ground human intelligence.

This system of the present invention may be used to fill a void that exists in data availability. Sometimes the only person on the planet that has specific information required, is someone on the ground, at the moment, "on location" so to speak.

News organizations send out reporters to distant locations to report back to their respective news organizations. Our system allows anyone in the world to be the reporter, on location, sharing the context of their environments as events unfold. The real time map and the ability to share present on the ground intelligence the network needs are crucial.

In embodiments, the system revolves around a map-based framework that focuses on location rather than a chronological feed or an arbitrary sorting by user popularity.

The structure of the map keeps the focus on the location, and the people in the locations, and the users near that location, rather than popularity or some arbitrary scoring system. Chronology is important, but more so immediacy in providing the data needed, and reflecting the location events are occurring. This allows a user to zoom to an exact location where the information they want exist, enabling them to find the people "on the ground" who are best suited to have up to data knowledge about their environments.

In embodiments, users may have the ability to form sub-communities based on interest, topic or a trending event. The users may choose what topics they share, and what sharing options are available in those communities. In this way users create their own maps, with their own particular set of uses.

For example, the system is able provide a quick menu interface. This quick action menu may contain several presets or default sharing options allowing people to quickly select and post default state data or post specific content on the go. These presets or custom selections may populate the quick selection menu of a specific channel allowing users to quickly share information on the go without having to type in specific information. In this way presets for a shopping channel might include "item sale," "storewide sale," "price drop," and a channel about nightlife could contain quick selection options related to "great music," "fun party," "lively atmosphere," "special event," etc. In embodiments, this one mapping system will be able replace many specific mapping-focused apps such as hiking apps, nightlife apps, and driving apps, as well as monetized mapping apps such as Uber, Lyft, and Postmates. Like a Lego, the system uses a single app many uses model providing the non-obvious effect of allowing a single mapping platform to replace an almost infinite number of single use mapping applications.

Providing a diversity of sharing, making the ability to share and receive said data in real time turns what would otherwise be an enjoyable system of sharing, turning it into a legitimate tool to learn, and share relevant and useful data about which the user wants to know.

Additionally, it would change a social network to a social tool relevant and useful in our fast paced lives providing context to our decisions.

Referring to FIG. 1, an illustrative embodiment of the invention is shown. FIG. 1 demonstrates a system user submitting observational state data using a client device represented in the form of a mobile computing device 101. In this case the state data is an observation of a newsworthy event as represented by an ongoing protest. The state data may be submitted by client device 101 and transmitted over a network connection to a networked server. After undergoing various processes on the network server, the data is shown being received by a second mobile computing device 102.

The state data 120 submitted by the first client 101 and received and displayed by the second client 102 may contains various information, including:
  (a) The user's observations of the event (#protesting) including the perceived mental and physical states of the people being observed (#angrygathering) 120.
  (b) The emotional mental state context information from the user in response to the observations (#scary), current or recent preoccupation or goal of the user (#shopping).

Passive state data (here, location data related to the first client 101 as might be captured by a GPS sensor embedded on the client device) and its location may then be displayed on the map 140 symbolized or visualized in this instance a circle or pin 122. This location could be related to the perceived location of the event, the user's current location, or the user's location at the time of submission. Each and every one of these events may be enabled through the use of different representative symbols. A single embodiment may include all of these options possibly through differentiating them visually.

Structure may be applied to the state data submitted by the user in various ways, and in various stages of the submission process, allowing the data to be sorted, filtered in a detailed manner.

Referring again to FIG. 1, software on the receiving device may allow the system to filter the map 130 by various parameters. In the example of FIG. 1, the user has set filtering options as to only submitted state data related to "Scary"+"Gatherings."

Myriad combinations of state parameters and attributes are contemplated including, without limitation:
  (a) "Fun"+"Parties"
  (b) "Exciting"+"Concerts"+"In NYC"
  (c) "Scary"+"Events"+"Uptown"
  (d) "Relaxed"+"Businesses"+"Downtown"
  (e) "NightClubs"+"Sexy People"+"Club District"
  (f) "People"+"Looking for a Date"
  (g) "People"+"Who need a Taxi" on "5th Street"
  (h) "Delivery Drivers"+"Near Me"

Hashtags are only one example of state data structure provided by exemplary embodiments of the invention. Other examples include, with limitation, metatags, buttons, keywords, sentence building, submission types, categories, channels, and auto-complete options, among many others.

In embodiments, structure may not contemplate a top-down organizing system, but rather a process or method that provides some framework of organization for submitted data. Depending on the specific implementation of the system, the structure may take the form of a very loose system of organization or a very strict top-down system. Indeed, rather than acting as a restriction, the structure provided by the system increases the practical flexibility available to the system.

In embodiments, information shared by a user is referred to in this disclosure as "user states" or "state data" and is placed in the context of a user's geo-locational context, such as on a map.

Figure 2:
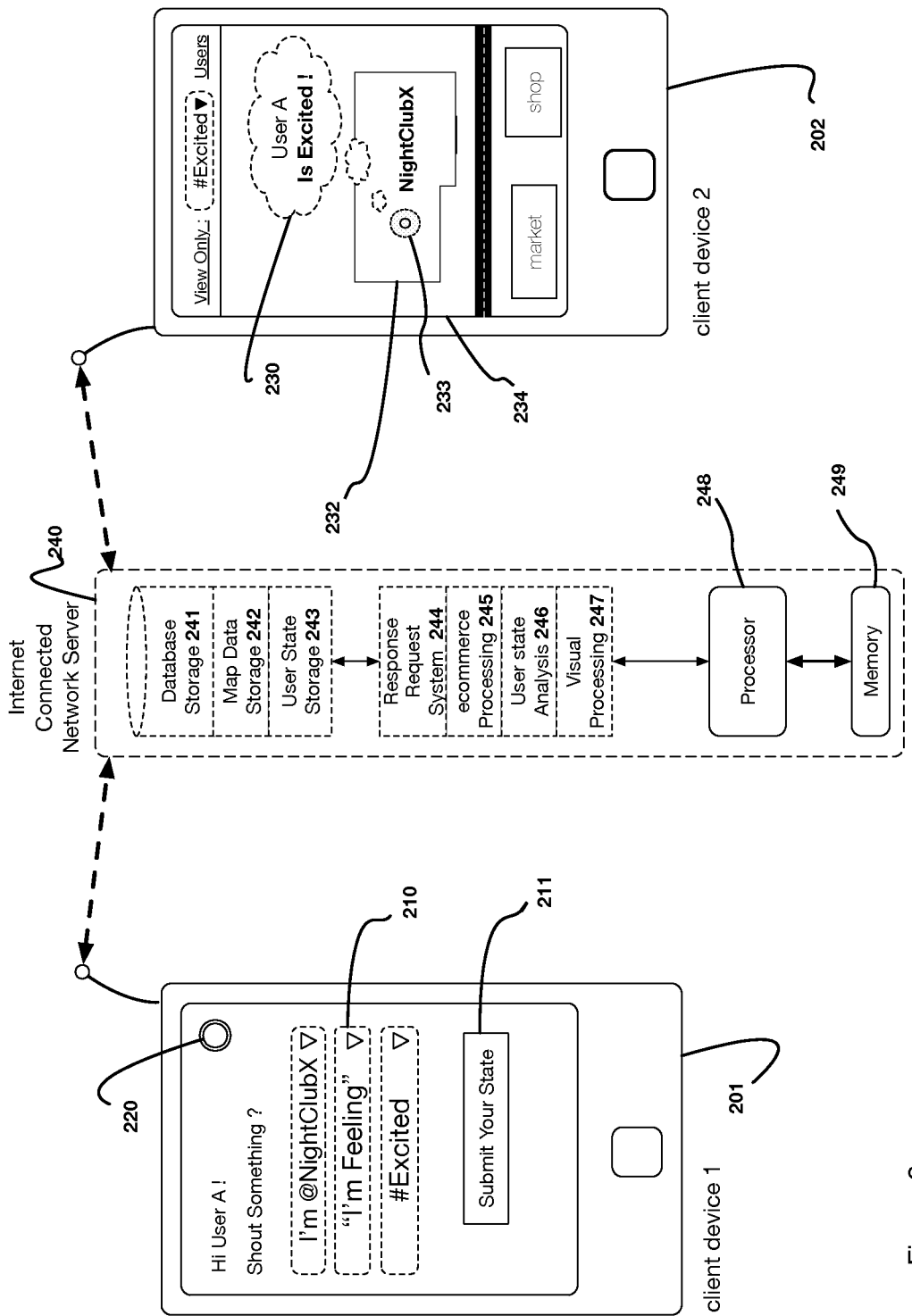
FIG. 2 is an illustrated embodiment demonstrating the submission of state data using a client device.

Referring now to FIG. 2, an embodiment of the invention is shown in which a client device 201 may enable the entry or selection of state data 210 and the submission 211 of said state data. The client device is represented in this embodiment as a smartphone.

The client device may send submitted state data over a network connection to a network server 240. A plurality of user state data may be gathered, analyzed or combined in various ways, with state data of other clients and supplementary data from both internal databases 241 and external networks.

Once the data has been processed by the network server 240, it may then be sent to or retrieved by a second client device 202 and displayed in a geo-locational context such as on a map of a region, as an overlay, or as geo-centric data.

The state data and other data may then be retrieved by a second client device 202. These data are subsequently displayed on a second client device 202 and displayed on a map 234 and or along with relevant geo-locational content, 234.

In embodiments, the system is capable of accommodating a very large number of clients, both submitting state data as illustrated with the first client 201 and receiving data 202. Submitting and receiving is not mutually exclusive meaning that a submitting client has the ability to receive data and receiving clients have the ability to submit state data.

Figure 5:
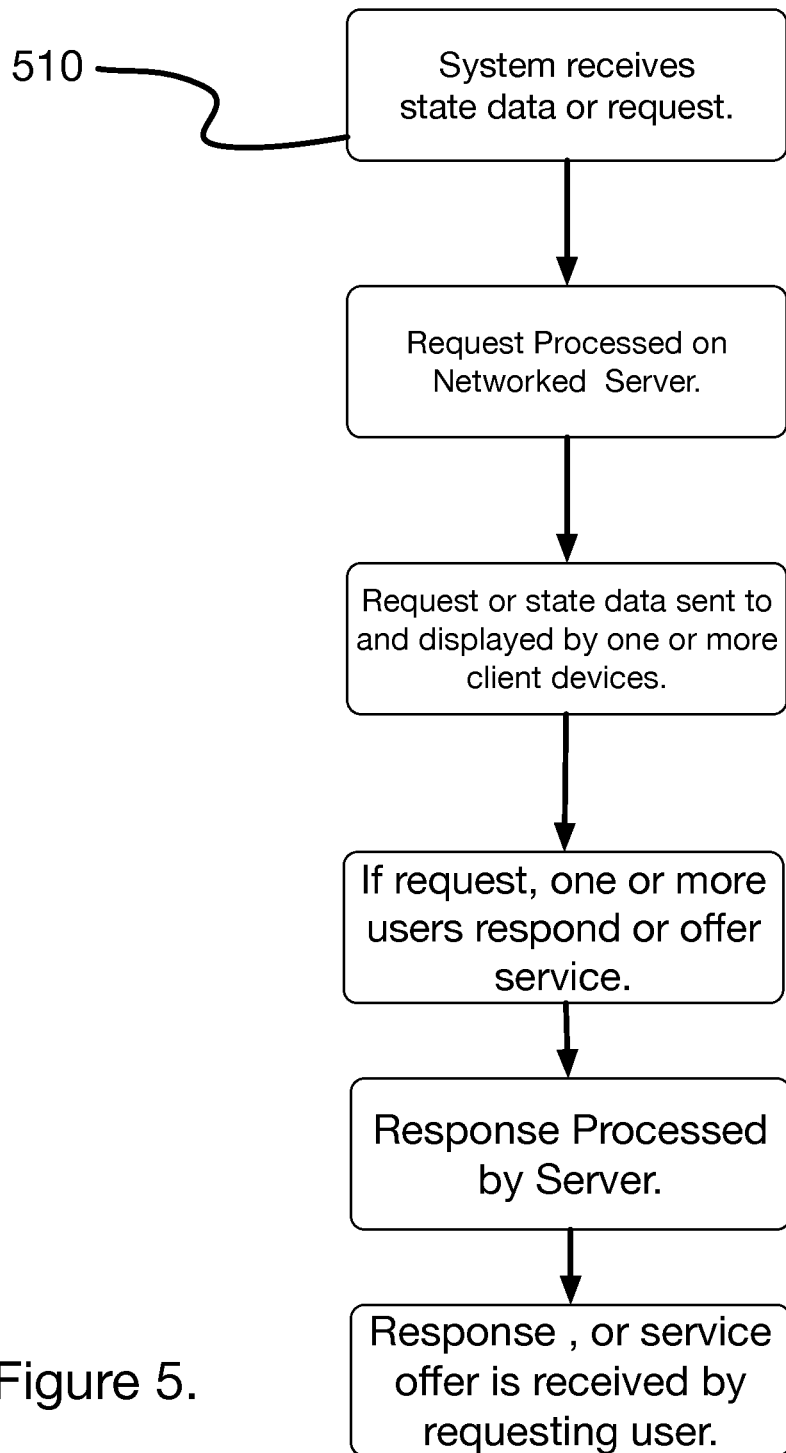
FIG. 5 is a flowchart showing an embodiment of the invention.

FIG. 5 provides an overview summery of the foregoing process steps.

Guidance and data categorization may be provided in any part of the data retrieval process, including data that has yet to be submitted, is currently being submitted, or has already been submitted. For example, the system may be made to work with random data where the submitted information may be analyzed by a computing process which takes previously uncategorized data and attempts to categorize and make sense of the data after the fact through processing. One means of achieving this post-submission categorization could be natural language analysis via a processor 248 on the networked server 240.

Many major advantages exist in providing a structure to received state data. Providing structure during submission makes it significantly easier to aggregate, filter, quantify the data or run it through statistical analysis, display in retrospect and importantly, to visualize said data.

The system may differ depending on the embodiment, to a strict structure such as but not limited to setting overlays and submission options from the top down. To a more open structure such as, but not limited to allowing users to create overlays and or select submission options. This structure would have a goal of using this structure to allow for some aggregation of data or to keep the data from becoming to become randomized.

In embodiments, a "build-a-sentence" structure 210 is used to allow a mix of both word and sentence selection, as well as freeform and manual entry. However, embodiments may employ an organizing submission methodology beyond a sentence structure, which is but one practical way to guide users on sharing state data and organizing that data into sensible information. In embodiments, the system may use methods such as hashtags, autocomplete, option selection, dropdown, and other methods of selection.

In embodiments, structured state submission using a sentence structure may include both actively-gathered and passively-gathered data. Active data retrieval refers to user states that are obtained through the active participation of the user through some or most of submission 211 of user state data 210. Passive retrieval generally denotes that the submission of state data is achieved partially or mostly through automation or through some hardware such as sensors and input devices. Non-limiting examples are those that enable the capture of body signals, video signals or audio signals or capture other state data through some form of input hardware or automation.

Examples of actively-gathered sentence structure data may include:
 (a) "I feel" (mental state—emotional)
 (b) "I'm feeling" (mental state—emotional)
 (c) "I'm currently doing" (mental state—preoccupation) "I see" (observational state)
 (d) "I saw" (chronological observational state)
 (e) "I found" (chronological observational state) "I'm reporting" (observational state)
 (f) "I observed" (observational state) "I just found" (observational state)
 (g) "I noticed" (chronological observational state) "I'm amazed at" (mental state emotional)

Actively-submitted data may include user submissions through forms, popups, option selection, postings, voice, writing, or any other form of communication.

Examples of passively-gathered data may include:
 (a) User location
 (b) Determination of whether the user is currently at a business establishment or event
 (c) Current time
 (d) Physiological data received from sensors (e.g., heartbeat)
 (e) Video received from a wearable sensor
 (f) Audio received from a wearable microphone Non limiting examples of passive submission include GPS, video input devices 220, audio input devices, accelerometers, barometers and other input and sensor hardware that are able to obtain information about the user and users environment.

FIG. 2 discloses one possible method of displaying a plurality of user states 210 for state data selection 211 as may be seen on a touch screen device or mobile phone 201.

While the terms active and passive retrieval are useful for descriptive purposes, the dividing line between the two is not exact and overlap may occur. Some active processes may involve passive submission and vice-versa.

Widespread data submission in this manner may effect in providing users with a real-time pulse of goings-on in a city or region, from the perspective of others, both retrospectively and in real time as it is happening.

Aggregation & Visualization of State Data

Providing structure without necessarily limiting the topics of information shared with the aggregation and grouping of retrieved state data from a plurality of users, through finding patterns in said data and visualizing these patterns.

Referring again to FIG. 2, state data 210 may be received by the networked server 240, the server processes said data on a processor using a state data processing system 246 which runs the incoming data using various statistical analysis and aggregation techniques. The user state data may be aggregated into recognizable patterns and displayed on a client device 202, on a map or in a geo-locational context using a visual processing technique 247.

In embodiments, these patterns may be visualized through overlays having different visual styles. For example, overlays may include visualizations with different densities, hues, saturations, patterns, sizes, textures, opacities, and shapes, among others. An almost limitless number of visualization styles may be used towards the goal of providing contrast between one set of aggregated data with another.

As an illustrative example, some styles may resemble a classic Doppler radar weather map. Whereas the goal with a Doppler system would be to contrast different types of weather (precipitation, snow, cloud cover and rain patterns), some system embodiments may use a similar visualization to contrast different patterns found within a plurality of user state data.

Figure 3:
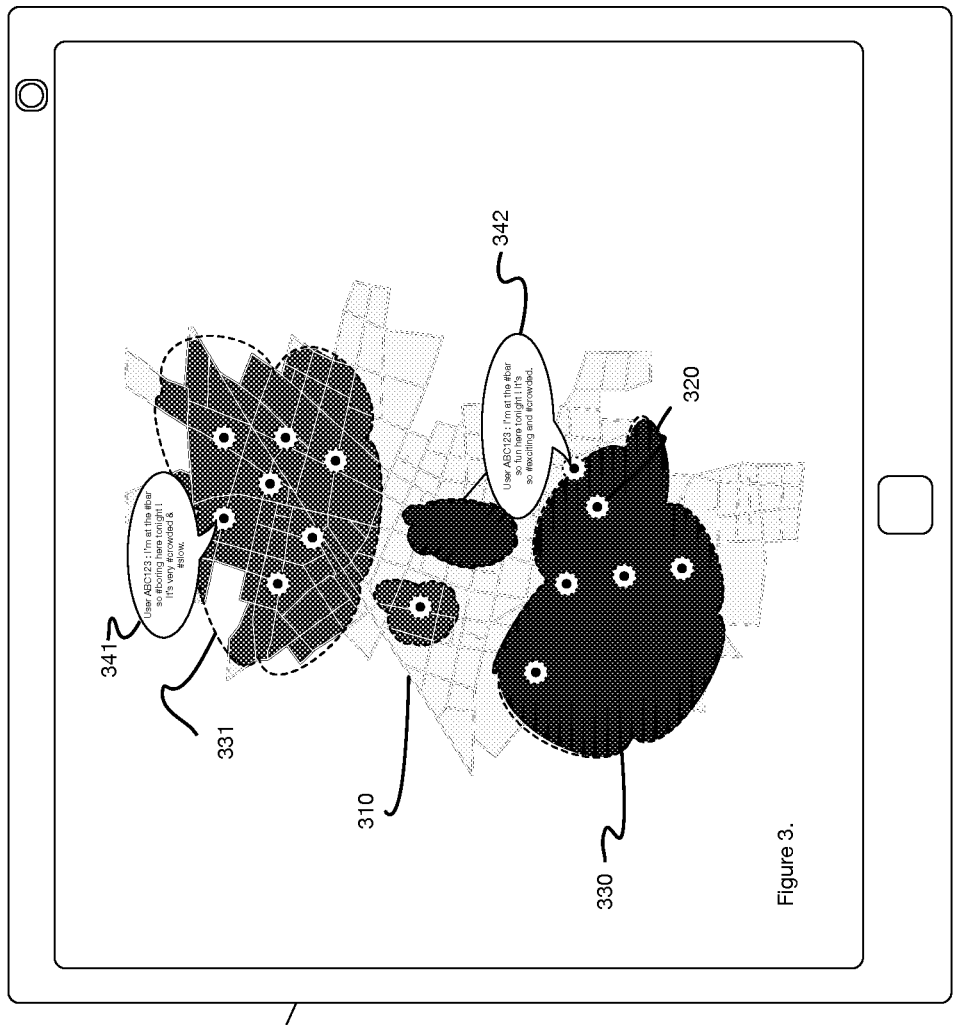
FIG. 3 shows an aggregation of patterns found within the state data of multiple user submissions and visualized in aggregate on a map of a region.

FIG. 3 shows one possible method of displaying patterns found within combined state data submitted by a plurality of system users. A city 310 is shown on network-connected portable touchscreen device 301.

In embodiments, state data is not limited to display in aggregation; individual postings of state data from individual users may be integrated with or without aggregation.

Referring to FIG. 3, the circle with a dotted line 320 to act as a symbolized representation of submitted state data. This state data may be the current location of the user who submitted it or the location where said state data was submitted. Here, a pop-up 342 may be used to show the posted content of the user-posted state data.

State data from individual users may be visualized in a number of ways such as map pins, dots, symbols, icons, characters, shapes, and lights, among many others.

Aggregated state data or the patterns therein are shown in FIG. 3 as contrasting overlays 330, 331. These overlays may act to visually symbolize an aggregation of two different patterns state data from a plurality of users, a simplified example of which could be users that are feeling happy versus users that are feeling sad. This is meant to be seen as a simplified illustration of an embodiment and embodiments showing aggregated data may easily go beyond two contrasting patterns. These may be highly complex visualizations showing a plurality of different patterns found within posted state data, demographic visualizations of the posting users, or different visualizations for any aspect of state data or state data submitters including but not limited to time, location, demographics, feelings, thoughts, observations, and the like.

In the embodiment shown in FIG. 3, a black overlay represents a pattern of state data, while the white overlay represents a different pattern. Different types of data may be displayed in different styles so as to differentiate them from each other.

This illustrative embodiment is just one example of how this system may enable a novel holistic perspective of real-time human activities. Using individual posting of user location and or state data, as well as aggregating this information into overlays showing aggregated activity, a real-time overview of human activity can be generated as represented by state data. These display techniques are not limited to the city level and may be shown on scales ranging from the minute (room, floor, building) to the large (nation, planet).

Request System

In embodiments, the system enables a user at the POE to submit data in a structured and categorizable way, which may change the types of information users share and increase the usefulness of said data.

In embodiments, a mechanism may be provided for users to request or search for information from the network in real-time. "Searching" for data is a discrete concept from "messaging" users on the network. We use the word search, and not just "message" because this is one of the goals in the request system. Conventional search engines may be limited to previously-recorded or indexed data. Much if not most of the world's data is occurring in real time, as seen by real people within our very cities or it is information held by the memories of locals who have been observing their communities and know these communities better than anyone, and would be overlooked by conventional search engines.

In embodiments, a request system may allow for two-way communication of requests and responses related to map locations, state data, multimedia content, and other system information, thereby allowing users to ask questions about current state data, modify existing state data, or request new state data.

Figure 4:
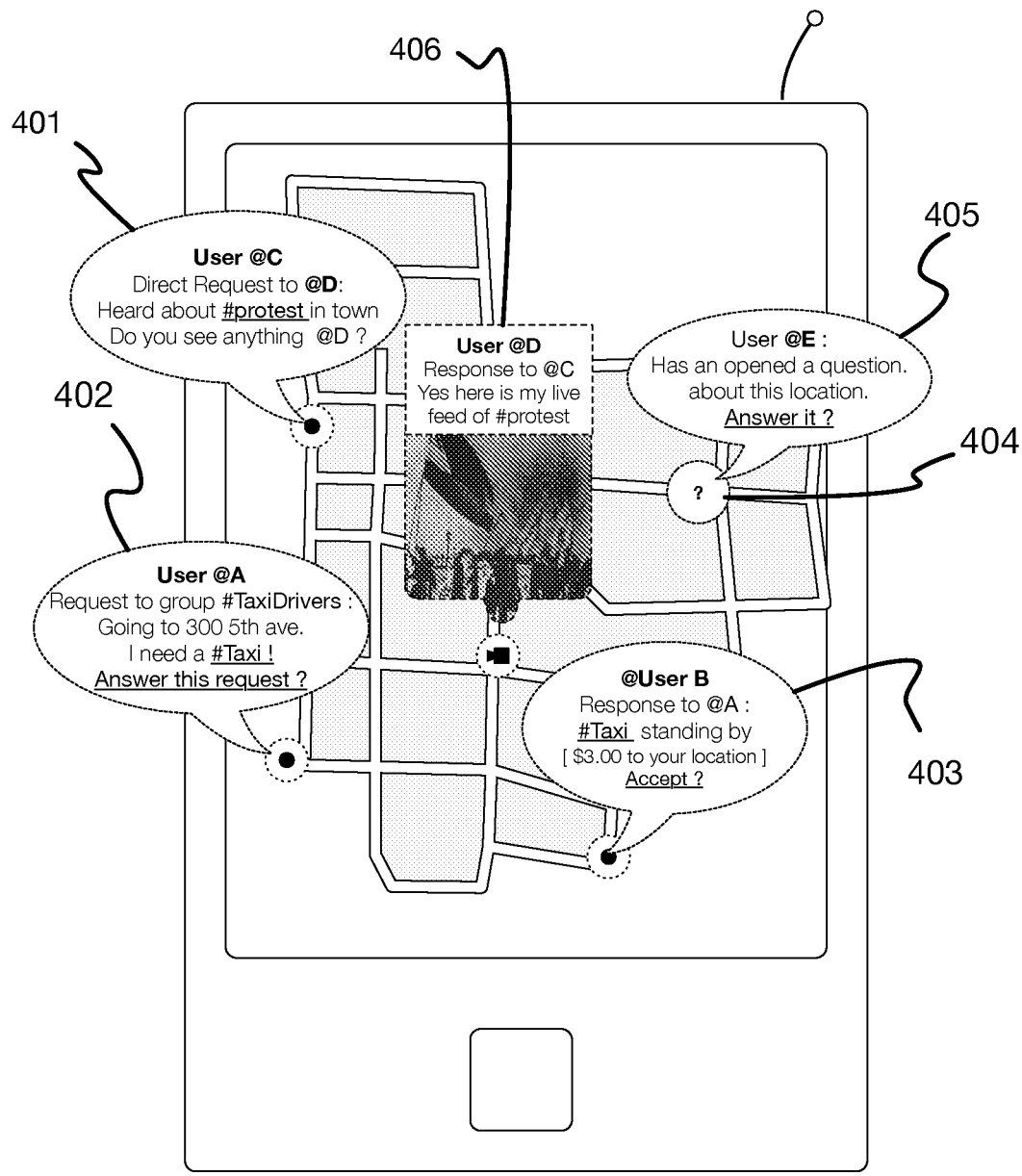
FIG. 4 is an illustrated embodiment showing the request response system at work wherein users posting request for information are addressed by service providers and passively submitted state data.

FIG. 4 shows an illustrative example of the request/response system in operation. Request for information or services can be sent by one user to another user through a direct request 401 (a direct request for information from one user to another), or from one user to a group of system users 402 (e.g., an interest group, a group of service providers, or a company with many employees). One or more group members who receive the request may respond directly to the requesting user by sending a response to that user 403.

Requests may be addressed to no specific user at all but rather pinned to a specific map location or in an area on the map 404.

Questions can be left open in ways beyond the geo-locational context and may be left open in the context of time, event, location, or any other category of state information.

Placing questions for anyone to answer beyond a specific address or person, may act as a way for a user to request contextual information about the location, event or place without needing to address the request to a specific person, instead leaving the question open or pinned on the map 405. Such a pinned request may be seen and responded to by a plurality of users or anyone who happened to know the information request.

This symbiotic information sharing may be strengthened through passive sharing using sensors. For example, input hardware may be any combination of audio input and recording devices, video input and recording devices, devices enabling the sharing of physical state data from one client user to one or a plurality of client users. In this way, the user in the field comes close to becoming an avatar, experiencing the world of another user from that user's perspective.

By way of example, a live video feed may be pinned or shown in the context of a location on the map 406, as is the case of user @D's response to user @C's direct request. Of course this is not meant to limit the context of passively submitted data and video feeds may be posted as state data outside of the response/request system, but this illustration shows how a user might request information about a certain event or place and may be provided live sensor data in addition to manually inputted information.

Services Market

In embodiments, buyers and sellers may be enable to start their own map-enabled services. The integrated system of request and response, and the structure provided within this system allows it to be uniquely adapted to a market-driven system that allows multiple industries to compete within the same application. In embodiments service providers may organize their own "sharing economies," delivery services, or map enabled services, within a single system. In further embodiments, service providers could have their own individual maps, and entire industries could have industry-specific maps, created specifically for service offers where different service providers compete with one another.

Service providers may be able to offer services on overlays that are not specifically tailored for service request, allowing service providers to offer services on potentially any overlay within the system, enabling service providers to list services within existing interest overlays or map channels.

These map overlays (categories) may be created simply for offering services, where multiple providers compete with each other on a level marketplace driven playing field.

In embodiments, service providers may be large hierarchal companies with many employees such as Uber, Lyft, Task Rabbit, Field Agent, taxi fleets, restaurant delivery companies, parcel delivery companies, and many others. These types of businesses generally offer their services on their own independent map applications, but would benefit from the present invention and its structural flexibility.

Although such services allow limited competition, their scope is limited to specific types of industries and are mostly a top-down model. This system would be designed in a way that Uber and Lyft, for example, might compete with each other in the #taxi or #driver categories.

This system could, depending on the embodiment, enable services for service providers from very large companies with many of their employees using the system, all the way to independent entrepreneurs or freelancers, allowing all to compete in a single marketplace. Furthermore, the system will allow companies or individual users to form service groups, which could be a collection of service providers which feel it advantages to bind together in a service collective to offer services.

Referring again to FIG. 4, a user directing a service request to a group of service providers 402 is shown. User @A 402 is shown posting a service request to which user @B 403 responds, in this case providing a price quote along with his request.

In embodiments, users may direct requests to single system users, groups of users or co-ops, groups of providers, companies of any size and their employees, or by placing the service request directly on the map 405, leaving responses open to any provider or a restricted group of providers.

In embodiments, an open design format is used in which the request and response system may be adapted to nearly any industry that can make use of maps in offering their services. Some embodiments would not be structured towards a specific service, although other equally useful embodiments may be specialized or have specialization options for certain industries.

In embodiments, a services marketplace may be constructed on top of or integrated with a larger social network as described herein, providing enhanced functionality to the marketplace and users of the social mapping system.

In embodiments, service providers may be enabled to better gauge interest in a certain product or service by ascertaining the size of related topical groups. For example, a #pizzalovers group might be a great place for a pizza delivery company to offer its services.

Topical overlays or channels may also be used by service providers for applications beyond gauging consumer interest. Channels may be organizing structures for gauging consumer interest and for providers to aggregate into groups, as well as for users to find providers related to services of interest. For example, a topical map overlay or category may relate to biking and provide a framework for biking enthusiasts to share information about trails, traffic conditions, biking events, and the like. Such an environment may provide an opportunity for service providers to meet, communicate and come together to form a service provider co-operative offering delivery services, for example. Of course, this is but one possible application and the embodiments described here could be useful in a myriad of ways to other industries. Indeed, this could be used potentially by any business to promote their locations, events, services and to gain direct access to a wide variety of users.

As a further example, a map may exist for nightclubs in a particular area. A nightclub may wish to promote to users on just that channel by offering promotions or coupons to visit their location or event. Alternatively, the business could utilize the channel to gauge consumer interest, targeting their promotions or invitations using the demographic information the system receives from users. For example, a club might send out VIP invitations or promotions to only people in a certain area, of a certain age, gender or interest. By doing so, the system becomes a real-time demographic mapping system with the capabilities to target specific demographics. This demographic information is not limited to gender or interest and comprises any and all demographic information that marketing companies are generally understood to collect about consumers for marketing purposes.

Service Responses

Once a provider sends a service request a user may browse one or many competing submissions and respond in myriad ways including accepting the offer, declining the offer, submitting a counteroffer, or providing additional location information or additional state data.

Referring again to FIG. 4, a user 402 has indicated he needs a taxi, and he needs the taxi to take him to a location that is not his current location, specified as "300 5th Ave." The user has thus set a geolocational context to their request, which in this simple example is a delivery or destination location that is not his own.

In embodiments, geolocational contexts may include: (1) requesting the user's current location as the place of service; (2) requesting some other location or destination for the service, including marking the requested location on the map using a visualized symbol; (3) requesting the location of a particular event such as a concert; and (4) requesting a specific address or business location, among others.

Passive Aggregation

In embodiments, passively-tracked information may be aggregated and utilized in a variety of ways and for various purposes. In embodiments, a user may first give permission to the system to track the user's location data while not using directly using system. Once permission is given, state data can be received from many users, and aggregated in a way that this data may be made useful to advertisers, and or other users.

For example, passive tracking of system users permits calculation of:
  (a) the number of people in any given part of the city
  (b) the most popular business or events in a region
  (c) traffic patterns based on aggregated movement
  (d) weather patterns by analyzing user activity (e.g., are active user outdoors)

Virtually any passively-tracked data and activity may be aggregated to form statistical information about user activity, which information can then be relayed on the map.

Through combining user-submitted demographic information the data might be used to further focus into the amount of human activity, kinds of activities, and the people participating in those activities. Examples may include:
  (a) the number of users who like buying shoes are in a specific part of town
  (b) the number of user fitting a particular demographic are at a particular location (e.g., the number of men under the age of 40 who are at a particular bar)
  (c) the socioeconomic makeup of a certain area, as displayed on the map in real time
  (d) the number of sports fans who live and work in a region along with specific information on their current locations
  (e) the number of self-described "geeks" who are currently reading science fiction books in an area Embodiments of the system are able to make use of demographic information in ways previously unavailable. By receiving passively-tracked information the system is able to integrate demographic information, mix and match patterns found in the information, and display the results in real time or almost real time. The information may also be displayed in retrospect allowing a user to see changes to this data over time and additionally to mix and match this background information with posted state data to come to a larger picture of human activity, thoughts, feelings, interest, observations and other aggregated patterns based on passively tracked and or actively submitted information.

Map Channels

In embodiments, maps channels may be provided to filter content so that users may access content that is meaningful to their individual purpose without resulting in information overload. Various types of content filters may be available, and may incorporate both strict structure and well as loose structure.

In embodiments, user-generated tags may provide structure. In other embodiments, users or user moderators may be given the opportunity to create their own map overlays. In alternate embodiments, the system may enable users or user moderators to set the structure of submissions, i.e., to individually set the form of permissible state data. In this way, a map overlay dedicated to, for example, nightlife might have a completely different user state submission structure than a bird watching or crime overlay.

In embodiments, structure may be provided not only by topic and interest but as categorized state data. Embodiments of this structural framework go beyond aggregation and has additional advantages such as categorization of incoming data.

For example, some embodiments allow users to create hundreds or thousands of active map channels or overlays, each with a different topic, interest or goal. Users may structure submission types differently in each map overlay to make the state data best suited for that category. This may also allow visualization of aggregated information to be specific or different for each topic, interest or map overlay.

Some embodiments may enable users to limit state data submission so that the resulting map may be focused for a single topic. Other embodiments use a more open system of tags, which may then be sorted allowing filtering of map data to state data having specific content.

In embodiments, hash tags or other types of tags that fill a similar role may be used to create map topics. These map overlays are similar to filters or categories found in existing social media systems, in which you are able to see post about a specific topic or interest. Map overlays might be considered analogous to categories or feeds, and may range from temporary to more permanent and may use different types of classifications systems not limited to hashtags, sub-groups, and other categorization methods. While feeds are a list of recent postings, overlays are a list of unique map data and or user state data that may be combined or used as different views so users may see a map view, and then move over to a chronological feed of the information, giving users the best overview of said state data.

Categories allow users to form topical interest groups, so that many different users with different interest can each form their own groups, without this functionality, a social mapping system would quickly become confusing with many competing interest, topics, users and posts.

Some overlays may have specific data, while others may be a mix of data, even including a mix of different categories. In this way the overlays are not necessarily static categorizations but provide a framework for users to assemble themselves, creating their own map overlays to share with others with their same topical interest.

Tag-Based Feeds

In embodiments, hashtags or keywords might be used within a user post to generate impromptu channels, allowing users to share information on a specific topic, the topic in question being its own map of a region. Examples may include concepts such as dating, senior_dating, amateur-newsreporters, birdwatchingnyc, bigfootspottersoregon, nightclubbinginla, or trainspottingclub. Topics may also trend just like hashtags found on other social media feeds. User might create a #Dating topic, to meet other people, or create more specific tags such as #JewishDating, so as to narrow down the map to specific people or interest.

In such an embodiment each hashtag could be its very own map overlay. One hashtag might be something broad such as #crimereports where users could then post any crimes in progress. Others could be specific such as #city-concerts or where users share information about goings on about music events around their area. Of course, the system is not applicable only to local events. A user maybe able to track reports of an ongoing news event from halfway around the world, as many did during the 2008 Arab Spring uprising that was followed by many people outside the region.

These categories would act in providing topic and interest categories for the submission of state data.

In embodiments, user status post may be integrated. These status posts are analogous to the check-ins predominant in social media and traditional mapping applications. Like check-ins, they may also be used to share your current location with friends, but also to set a meeting location with your friends, for example, a certain bar or establishment. Unlike check-ins, users are given a structured form submission system where they can post related information.

Sentence-Based Input

In embodiments, a "complete a sentence" system may could allow users to select from a dropdown menu of set selectors. The options to build this sentence may act to describe human experiences, observations, feelings, and actions, among others. These sentences may be selectors encapsulating options to describe the content of state data not limited to a person's feelings, experiences, thoughts, a user's state, goal, or current preoccupation.

These experiences may themselves be seen as tags for which a user may search, categorize on, and filter. For example, the system may allow a user to filter out other post so they only see people who are having a specific experience or doing a specific activity, regardless of the category in which it was originally posted.

Various sentence structures are contemplated, each allowing users to build a sentence from among multiple sections fitting together to make a sentence. Examples include:

(a) I feel amazing
(b) I'm reporting a crime
(c) I see/I saw something happen
(d) I found a wallet
(e) I'm doing yoga
(f) I'm having fun
(g) I have a question about gas stations
(h) I'm looking for a date
(i) I'm am looking for companions Users may then use tags such as #date, #gas_stations, #crime, feeling #amazing, #foundwallet, to sort and filter the map. The user could then finish this sentence manually: I'm reporting a crime, "someone just got robbed on 55th Street." In this way information is sortable without limiting the actual content.

Fine-Grain Overlays

As a simplified example, a moderator may limit submissions to one of two things, "happy" or "sad." A moderator may start his own category based on a topic or interest and then moderate and oversee said category or topic.

In this embodiment, an overlay may be created displaying real-time user evaluations of their own happiness, by location, perhaps colored in red for "happy" or "blue" for unhappy. This resulting map would incorporate, in this example, perhaps thousands or even millions of users submitting just one of two state data and through the viewing this display, areas can be identified where self-identified "happier" people exist.

Taking the example to the next level, these "happiness scores" could, for example, be broadened to a larger range of happiness scores and could be put to use in the allotment and reassignment of government funding, for example, policing policies to focus those efforts, and direct funds to help communities most in need.

The foregoing is but one example of many that may be utilized with the present invention.

Events and Emotion

In embodiments, the system may allow a person to quickly ascertain human events or activity in an area (e.g., block, town, city) and the emotional tone of that activity. The information may be shown variously through an interactive heat map, which is a color overlay over a map of an area. Variations may include graphs, graphics, infographics or a plethora of other data displays methods and forms.

The system is by no way limited to "night life" or "social networking" or other consumer usage scenarios. The ability to display human interaction data on a real time map also has broad commercial application some non-limiting examples include military engagements, news gathering and reporting, political usage such as crowd gathering.

Emotional Hashtags

Embodiments of the system may provide a structured manner in which to post a user's current emotional state, which can be done through a system of emotional tags, which are essentially hashtags denoting a certain emotional state. These hashtags can be aggregated by giving a color to the positivity or negativity of a set of emotions, and relaying this emotional tone in mass. This would allow a user to see the emotional context of their city at any given time, along with the events, goals, intentions, observations causing those emotions to occur.

Request System

In embodiments, the request and response system is a type of submission that allows users to ask other users for contextual information or state data from other users. In embodiments, users would be In one embodiment, the users would be able to request:

(1) Context about a specific location, i.e., "do you see this person?" or "have you seen a post office box near you?" or "I'm looking for this widget, have you seen it?" The response could come in a yes, no or other customized response.

(2) A location suggestion. Here, a user is able to ask other users to make a location suggestion, which could be about any person, place, or thing. Responding users would be able to respond by pinning a location on the map. For example, "do you know the best place to get a hot dog around here?" or "have you see a cab around your area?" or "if you have seen this person, please show me on the map please."

This system of locational request and response has numerous commercial and practical applications. For example, the system may be implemented as an upgraded Amber Alert system, where users in the field could instantly respond to received alerts. Similarly, military commanders could request information about military activity in the field and or the user state data consisting of physical, mental, and emotional observational states of their soldiers.

Graphical Display of Information

In embodiments, system information may be displayed using a plurality of graphical displays consisting of graphs, infographics, heat maps, visual indicators, and pins, or any other compatible visual method of data display may be used to display user input on a map or digital display.

Any number of color attributes may be used in parallel to visually display information in a way a user can understand. In some embodiments a heat map or color overlay may be used to display the concentration of users in a given map region. In some embodiments, saturation may be used to indicate the relative concentration or busyness of an area with more intense color used to reflect the number of system users or the size of the crowd in an area.

In embodiments, hue may be used to display an emotional score or a user's emotional state or emotional feeling about an experience. This could be their emotional feeling about the crowd (people around the user) or location (place) or other emotions related to happenings around them. Emotions may be shown as various colors or emotions and may be grouped together in color ranges. In embodiments, positive emotions may be grouped into reds and negative emotions into blues, though any combination of color ranges would suffice.

The graphical display may function like a weather map, except that rather than correlating with storm intensity and cloud cover, the colors would reflect the intensity of human crowds and emotional states of the users within the crowd.

As with other embodiments, the graphical indicators may display information on a macro scale (e.g., state, city or region) or on a micro scale (e.g., a single location).

Checking In

In embodiments, the system may provide forms for a user to "check in" to a certain location and enter their current state. A user may be provided a screen or form where they can enter this information in any number of ways.

In embodiments, the user may be provided with a form or page to provide "state" or "emotional" feedback. A user might be able go to this page himself or might be provided notifications or popups asking a user to enter his current user state or emotional feedback.

Data Gathering

As with other embodiments, data gathering on users' emotional states may include both actively-gathered and passively-gathered data.

Passively-gathered data may include information ascertained by positioning services (e.g., GPS) and other sensors (e.g., Wi-Fi position mapping, accelerometer, barometer that enable the gathering of a user's current physical location.

Active gathering may be provided by users through a series of prompts, forms or pages that request or allows a user to enter information consisting of emotional, state, goal or intent information. Such information might take the form of emotional feedback that is of a personal nature or emotional information that is contextual about their surroundings (their present social group, their current location).

Information

In embodiments, the system may gather "state" information about the user. These may be gathered by any combination of active or passive. Examples may include:

(a) A user's current physical location
(b) A user's location relative to that of other users, friends or crowds or events
(c) A user's current emotional state
(d) Emotional information that is contextual about the user's surroundings (e.g., present social group, location).
(e) Current social group
(f) The user's short-term plans
(g) The user's social media contact
(h) A user's current physical condition
(i) A user's bodily readings (as might be seen through physical sensors)
(j) A users viewing current location (as might be seen through glasses or a camera)
(k) What the user is currently looking or perceiving (as might be seen through augmented reality glasses)
(l) User thoughts or emotions (as might be seen through EEG or ECG systems)

This information may also include contextual information about a given location, which may be submitted directly by users, or through outside or internal databases. Examples include:

(a) Is the location a place of business (bar, restaurant etc.)?
(b) Is there a known gathering or meeting scheduled there?
(c) Is there a concert or ticketed event at the location?
(d) Is the location a park, beach or other informal gathering area?

In some embodiments the contextual information that users may submit is limited to one or many submission options. In other embodiments the contextual information that may be submitted is unlimited. An example of contextual submission that is unlimited might be through the use hash tags or any other free form submission method allowing impromptu contextual submission.

As with other types of information, contextual information may be gathered both passively and actively.

State Data as Demographic Information

In embodiments, the system may gather demographic information from and about a user or users. This may consist of any information generally recognized as "demographic" such as, for example gender, name, age, interests, preferences, and the like.

Both of these embodiments are useful depending on the scope of the application. For example, an application that is focused to one industry may want to restrict the submission options so the map data is focused for display. In other situations, a free form embodiment would be preferred allowing users to create their own sub communities, feeds, maps or tags for depending on the interest, goal or use scenario.

Practical Applications

The benefit of displaying information in a real time geo-located context are applicable to many personal and commercial environments.

Example 1

Individuals heading out at night may be able to quickly ascertain social activity or events going on in their city, and select locations or events that are consistent with their preferences or goals.

While contextual information related to location of events is sporadically shared on social media regarding social events, there is no central location to go to that encourages the real time sharing categorization and aggregation of such events.

Traditional methods of finding popular events or gatherings usually relied on information provided ahead of the event such as advertisements in the local paper or event web site.

While social media has been sporadically used to provide updates about events, up until now there was no way to know which particular event was popular and going to a social gathering was generally a hit or miss affair.

Using the system of the present invention, location-centric information may be developed that consists of the quantity, quality, emotional tone, and descriptive nature of social gatherings, people attending those gatherings, or specific occurrences within those gatherings.

Example 2

Social activists may be able to share contextual information about an ongoing peaceful protest. This information may consist of real-time updates about crowd size, emotional tone, location of specific activists, sharing of specific events or incidents, the location of new meeting or gathering spots.

Example 3

Law enforcement could use RTSMS to develop a real-time map of criminal activity, as shared by users on the ground, providing officers map based overview of criminal activity and dispatch locations.

Example 4

In embodiments, the system may be used by military commanders on the ground to provide a way for a commander to see his soldiers in the field in real time, to request and receive status reports of their soldiers' locations, states, and observations. Reports may include video and audio feed data, real time body signals as provided by health and fitness tracking devices. Observed or suspected locations of enemy soldiers, all in the form of a mix of passive and or active state data. This system could serve to lessen friendly fire incidents which continues to be a problem on the modern battlefield.

Example 5

Citizens could be turned into impromptu reporters, allowing them to report criminal activity, news events, weather events, and other newsworthy happenings, sharing context about these events beyond simply location, and including information about people or events that occurred, emotional tone and any other information relevant to the reported human activity.

The system allows users to submit information about human activity in relation the location the activity occurs in. Allows users to submit their emotional state in relation to this location or the events.

State Data Embodiments

Embodiments of the system may be applied to virtually unlimited applications, examples of which include, without limitation:

(a) Traffic. An embodiment where the content of the state data may be related to the observation of traffic patterns or driver activity.

(b) Education. An embodiment where the content of the state data is educational or didactic information.

(c) Locational Observations. An embodiment where the content of the state data is related to the of a description of or location of a person, place or thing. This could involve a user finding something or observing something and relaying information about that find to all users.

(d) Object or finding. An embodiment where the content of the state data is related to a tip or notice of a description of an object, building or thing and or the location of an object, building or thing.

(e) News. An embodiment where the content of the state data is related to a newsworthy event or some unfolding event.

(f) Human Activity Level. An embodiment where the content of the state data is the observed level of human activity such as the busyness of a bar or event.

(g) Emotional Tone. An embodiment where the content of the state data is the observed emotional tone of a person or crowd of people, such as a gathering, nightlife, or some other observation of people's emotions or actions. Further embodiments where data aggregation enables tracking of the emotional states entire populations, large and small. An embodiment where the content of the state data is the observed emotional tone of a person or crowd of people, such as a gathering, nightlife, or some other observation of people's emotions or actions. This might relate to how a person views something, such as, this place is boring, or "this place is fun," or might include specific attributes such as, "This place is great—many well-dressed people here tonight."

(h) Weather and Natural Phenomena. An embodiment where the content of the state data is observations related to weather patterns or other natural phenomenon.

(i) Animal Activity. An embodiment where the content of state data is related to animal phenomena or animal activity.

(j) Individual Person. An embodiment where state data is in reference to a specific individual person.

(k) Dating and Romance. An embodiment where the state data is about dating or romantic encounters.

(l) Travel Plans. An embodiment where state data relates to the path direction of travel, for example, shared information about travel path, directional or travel plans.

(m) Multiple Points. An embodiment where the state data relates to a series of points or areas on the map or the location of more than one thing, event, or observation.

(n) Subjective and Objective. Embodiments of the invention may incorporate subjective or objective observations or experiences, which may be considered state data.

(o) Science. An embodiment whereas the data relates to science or scientific data. This includes any scientific or statistical data that is received from passively submitted data from sensors, examples being weather sensors, seismometers, traffic sensing and or actively submitted data.

(p) Crime. An embodiment where state data refers to observed crime, or any unexpected events, even if such events might not be considered newsworthy.

(q) Human Activity. Where state data consists of any subjective or objective observations of any human activity, movements, actions, perceived observations of mental or physical states an or actions.

(r) Air and Sky. An Embodiment where the state data is observations and said observations are related to objects in the sky or airborne, rather than on the ground.

(s) Tips Notices. An embodiment where state data is related to tips or notices or other important information provided to people in a given area.

(t) Gaming. An embodiment where state data and or request/response data related to a game, for example, some map overlays or channels may be roleplaying, mission or game related. Just one non limiting example may be a map based Easter egg hunt, or role playing missions where users turn the map into an adventure style quest, where users share information, with a set of rules or goals. Such an embodiment may use game like visualizations.

(u) Science. An embodiment whereas the data relates to science or scientific data.

(v) Health. An embodiment where state data relates to population health or indicators of health.

(w) Travel Tips. An embodiment where state data relates to tips from and to travelers or visitors to a location, such as information about the best things to do, to see, current events or gatherings act.

(x) Shopping. An embodiment where state data relates to current deals or shopping promotions.

(y) Data Archetypes. An embodiment where state data relates to the posting of archetypes, or classified groups, kinds or styles of person or thing or place. For example, state data relating to a list of doctors in an area, types of restaurants, styles of clothing stores. Additionally, the combination of state data and archetypes such as a listing on the map of the most relaxed parks, most focused work spaces, best tasting restaurants, sexiest dating events, most knowledgeable libraries, best spots for dog walking, best public areas for meeting friends, act.

(z) Map Links. An embodiment where state data is linked to from outside sources, a user might be able to click on data found on a third party internet sources, magazines, periodicals and other online sources. Upon activating or clicking, the user would be taken to a map or be shown state data on the map, be sent to a map topic or overlay. Additionally, links or other supplementary metadata may be provided so that users may be offered supplementary third party information, or be sent to outside sources through links attached to map overlays or state data.

(aa) Map Instant Messaging. An embodiment that allows users to send instant messages or direct message from one user to another, beyond the response request system. This would allow a user to locate another user on the map, and or that users posted state data. The system may allow a user to directly message any other user on the system through a free flow dialogue.

(bb) Offline Users. An embodiment where user state represents the observations of more than one person. For example, "we see" instead of "I see". Unlike aggregation where information is aggregated across system users posting information that fit certain patterns, this is more relevant when multiple users or non-users wish to combine state data. This could be five friends out at a club, who all believe the location is boring, one user could post representing the feelings or the perceived feelings of a plurality of people. This may be a reflection of the feelings, thoughts or observations of multiple people with physical presence who may or may not necessarily be a current system user.

(cc) Verification Postings. Another type of secondary post. This allows users to add their voice to existing state data. The system could give users a way to agree or verify or add their name to a list of users agreeing, modifying or supplementing (adding information to) existing state data. One illustrative example may be one user posting state data related to an observation. A second user may see the posted state data and choose to verify, agree, disclaim, modify, comment on, or otherwise add their voice in some way to the state data. Some non-limiting ways to accomplish this might be through the use of button allowing users to add linked or complementary state data agreeing or disagreeing with posted state data.

(dd) Services Marketplace. An embodiment where the request, response system carries information related to payment method and information, pricing information, and service offered at a given rate. An embodiment that allows several service providers to respond to a service request on a single request for services, allowing a customer to browse and select the competing company or individual provider he wishes to choose.

(ee) Service Ratings. An embodiment enabling users to leave reviews and ratings for service providers, so as to enable a system of trust between buyers and service providers.

(ff) Proactive Service Promotions. An embodiment that allows service providers to pro-activity offer services on a map or within a given location without necessarily having to respond to a specific request. This is similar to a storefront in that any service provider may advertise his services. An embodiment where a service requestor, provides navigation instructions, a path or driving route, pick up location, drop off location, multiple drop off or stop locations, or any other location, directions or locational information along with the service request. Additionally, the system allows service providers to equally respond or provide locational information with their service offers or responses.

(gg) Multiple Buyers. An embodiment allowing multiple buyers to get into a group and purchase something from one or more providers, whether those providers are connected through a formal co-op or not.

(hh) Traffic. An embodiment where the content of the passive state data is traffic data as may be sensed using a GPS and combining user data in aggregate to find out how fast or slow system users are moving, to figure out current traffic conditions.

(ii) Weather. An embodiment where the content of the passive state data is weather observations as may be sensed using a barometer, humidity detector or some other weather tracking device.

Devices

Myriad input devices may be utilized with embodiments of the invention. Examples include:

(a) An embodiment wherein the client device is a wearable device or display. An embodiment wherein the client device is a laptop computer.

(b) An embodiment wherein the client device is a desktop computer.

(c) An embodiment when the client device is an augmented reality display and or glasses.

(d) An embodiment wherein the client device is a holographic display or a device which uses holographic images to relay information.

(e) An embodiment wherein the client device is a retinal projection system or any system which uses light to shine information onto into or near a user's retina or eyes.

(f) An embodiment wherein the client device is a smart connected appliance.

(g) An embodiment wherein the client device is an e-reader.

(h) An embodiment wherein the client device is an in car display.

(i) An embodiment wherein the client device is a stationary display or map. This includes any road signs, mall kiosk, trade show, or any stationary display, billboard or sign found in a public place to relay information, directions, promotional information, educational information, not limited to a supermarket, mall, roadway, sidewalk, bus station, movie theater, restaurant, bar.

(j) An embodiment where the client device is a mobile tablet. An embodiment where the client device is a mobile phone.

(k) An embodiment where the client device is any mobile or portable mobile device which uses visible light as a means of display.

(l) An embodiment where the client device is any stationary device which uses visible light as a means of display.

(m) An embodiment where the client device is any device which uses audio as a means of relaying information and data.

(n) An embodiment wherein a second device supplements outputted information output from a client device. An example being a device that audibly supplements display information to enhance the feedback from the client device.

(o) Connectivity and Security (p) This system is in no way limited to a client server model and many other networking models may work better than another in one situation or another or based on a specific need. For example, embodiments exist where devices connect. Examples include:

(q) An embodiment where client devices take the place partially or entirely from a network server 140. Client devices could take over and or share computing and data relay responsibilities, including storage, analysis processing and networking act.

The system is capable of adapting to any network structure of any geographic scale, including but not limited to ad hoc networking, mesh networking, peer to peer networking, fully connected networking, a tree network, and any known networking protocols or networking methods. The system is capable of functioning device to device or in an intranet model without any active internet connection. This might be useful in models where security is paramount and a connection to the Internet could be seen as a liability. The system is able to adapt to any security or encryption model.

Demographics and Marketing

In embodiments, state data may contain demographic information or information about people's interest, likes or dislikes, or other marketing profile information generally relevant to marketers and marketing. This includes but is not limited to information related to likes, dislikes. This includes and is not limited to any segmentation of system users into market segments, including geographic, demographic, behavioral, psychological, occasional, cultural and allowing viewing and sorting of market segments. This would allow combination of one or more of these traits with location information allowing for geo-targeted marketing of specific market segments or based on a demographic profile of one or more users. This would also allow marketers to sort and filter users so that they could view a map channel or map overlay view of only users who fit the profile they are interested in marketing to. This information could be further enhanced by further sorting posted state data. For example, this would allow a marketing company to view a map of only people who like arts and crafts, who live in a certain sector of town, of a certain age demographic who have posted about state data about buying craft supplies in the last 30 days or have posted positive feelings about craft stores. rom In embodiments, both direct and indirect methods of demography are included in the aggregation process. In further embodiments, information from third parties or external databases is combined with state data to enhance or supplement aggregated information. In embodiments, state data contains information related to polling or elections, getting out the vote efforts.

Other Uses

Practical applications for the system of the present invention are virtually limitless. Additional examples include:

(a) Crime Data. An embodiment where the state data is related to crime data and or is used by a police force to keep an eye on crime trends.

(b) Entertainment. An embodiment where the information is related to music, or an an embodiment where the information is related to television or a television broadcast is supplemented with state data or state data supplemented with a television broadcast. This in effect may provide an enhancement of said broadcast and or combining the state data with a television signal to enhance both television viewing and the use of the system. An example might be a news broadcast supplementing state data or aggregated state data along with their news broadcast or supplementing state data with a television news report.

(c) Customizable Map Overlays. An embodiment where users are able to upload new visualization graphics, choose colors or otherwise customize the visualizations in a map channel.

(d) Moderators and Voting. An embodiment which uses moderators to choose rules, posting guidelines or limitations, choose visualizations or other overlays customizing the way post are made in the channel, how they look. Another alternative or additive embodiment may be a system of voting where channels are able to be fully customized by use of crowd voting through a democratic style system of customization.

(e) Aggregation Embodiments. An embodiment where state data or demographic data is statistically analyzed and extrapolation made about patterns found in the data. Just as a pollster could use statistical models to analyze a limited set of data to form hypothesis, using the limited data set to form conclusions about the parts of the population not polled. With enough state data from a set of users, we could likely form broader conclusions about a larger population through a limited but statistically significant collection of state data.

(f) Social Media. An embodiment which uses information from third party social media platforms, such as Facebook or Twitter and places this retrieved data in a locational context along with state data. Any data from social media postings, user profiles or the related information may be retrieved and placed on the map in a locational context, using either locational mentions within the post itself or data from a user's profile to determine the locational context of said data. This data may be posted along with the state data and or combined with state data in aggregate when visualized. This data may also be analyzed, categorized so that structure is provided allowing the data to fit with state data in a more seamless way.

(g) Search Engines. An embodiment where information is culled from search engines and posted along state data, to either provide further context to said data and or to Retrospective Display Embodiments of the system are in no way limited to the real-time display of data. This system has various practical embodiments using retroactive storage, analysis and display of information.

For example, while state data is very useful in real-time, patterns over time may provide additional useful information similar to how real-time weather data is important within the study of meteorology, but so are historical patterns. Display of historical data alone and combined with real time data dramatically increases the ability of predicting future states or information, and for a more complete picture of the meaning of state data.

For example, consider state data displaying the popularity or emotional tone of a city bar or nightlife establishment. While it would certainly be helpful to see how busy the venue is right now, real-time data might be deceiving as far as ascertaining the most popular bars in a city. For example, if the bar in question was having a specific event tonight, but on most days it is empty. Storing state data would be extremely useful for seeing historical patterns found within state data and could, for example, allow analysis of the hourly, daily, weekly, monthly or yearly business score or emotional tone rating of a specific establishment, permitting users to plan ahead and do research beyond the now.

As with other data described herein, historical data may be shown visually on a map, in graph form, output as raw data, analyzed, or aggregated data, or put into in any format.

Structure. An embodiment without the structured system of posting exist. Although we prefer a structured system, we do envision embodiments that use other methods to accomplish the goal of making data useful. It's the goal that matters from then the specific implementation to reach the goal of useful data. Even in structured systems, there is room for free flow entry and organization. This system is not limited to structured methodologies, either fully or partially. Structure as used throughout this document shall never be seen as a limiting dynamic of the system. Many other methods of making data useful exist, and not all embodiments rely on a structured system of posting. Some non-limiting examples include, self-organization collective intelligence, post submission analysis such as natural language processing, human information moderation, voting and review of incoming data and any other automated or human processes or organizational structures that makes the data useful as described within this disclosure.

Trending. An embodiment where channels, tags or other organizing structures are able to trend in a list. In this way popular events, news stories or topics are able to be listed as "trending" or "popular" enabling easy access and display of these trending topics.

Topical List. An embodiment where the system is organized into topical order, allowing users to browse hierarchically by subject.

Search Engine. An embodiment where users may search for map overlays with the goal of providing a detailed way to drill down to specific overlays.

Sorting and Filtering. A system that enables sorting and filtering of various tags or meta data to find map overlays.

Voting on postings. A system which enables users to vote on the most popular postings, leading them to be more visible or show more prominently on the map.

It will be understood that there are numerous modifications of the illustrated embodiments described above which will be readily apparent to one skilled in the art, including any combinations of features disclosed herein that are individually disclosed or claimed herein, explicitly including additional combinations of such features. These modifications and/or combinations fall within the art to which this invention relates and are intended to be within the scope of the claims, which follow. It is noted, as is conventional, the use of a singular element in a claim is intended to cover one or more of such an element.

I claim:

1. A system for location information on a social network, comprising:
   a computer processor; and
   a social mapping module executing on the computer processor and configured to enable the computer processor to:
   obtain, from each of a set of responding client devices, an intent to provide response to social media requests;
   register a mobile application executing on each of the set of responding client devices to obtain passive data from at least one sensory device using a background process;
   receive passive data from the set of responding client devices, wherein users of the responding client devices are not notified of the collection of passive data while passive data is being collected;
   repeatedly refine a passively aggregated dataset by performing automated analysis of the passive data received from the set of responding client devices;

receive, from a requesting client device, a request for one or more social media posts, wherein the request:
  includes geo-location information,
  is optional, and
  is made by a user of the requesting client device for a current time;
notify a first subset of the responding client devices that are within a geographic area established by the geo-location information of the request, wherein a second subset of the responding client devices that are not within the geographic area are not notified, and wherein the geographic area is not based on a location of the requesting client device;
receive, in response to notifying the first subset of the client devices, a set of geographically proximate and temporally recent social media posts based on the geo-location information, wherein the social media posts are made by the responding client devices that are within the geographic area and are made after the request is made by the user of the requesting client device;
apply, by the computer processor, grouping criteria to the set of social media posts to generate an aggregated group, wherein:
  the aggregated group is a subset of the set of social media posts, and
  applying the grouping criteria comprises:
    identifying, using the passively aggregated dataset and based on the request, a subset of the passive data within the geographic area and associated with the first subset of the responding devices; and
    selecting, based on (i) active data corresponding to each social media post and (ii) a data type of the subset of the passive data within the geographic area, the subset of the set of social media posts for inclusion in the aggregated group, wherein the selecting comprises excluding at least one social media post of the set of social media posts from inclusion in the aggregated group; and
provide, in response to the request, the aggregated group for display by the requesting client device.

2. The system of claim 1, wherein the geo-location information corresponds to a geographic map displayed on the requesting client device.

3. The system of claim 1, wherein:
the request further includes a set of filter parameters, and the selecting is further based on the set of filter parameters.

4. The system of claim 3, wherein the set of filter parameters comprises at least one selected from a group consisting of categories, hashtags, mental states, and descriptive adjectives.

5. The system of claim 1, wherein the request comprises a service request.

6. The system of claim 1, wherein active data comprises at least one selected from a group consisting of an audio recording or stream, a video recording or stream, an image, a text submission, a hashtag, a location indication, a mental state indication, an observational state indication, information provided through a form, and information provided through a selection of an option.

7. The system of claim 1, wherein passive data comprises at least one selected from a group consisting of video received from a wearable sensor, captured supplementary data from sensors or input devices, audio received from a wearable microphone, sensed user observations, user location determination by a GPS sensor, accelerometer data, barometer data, temperature data, physiological data, and body signals.

8. A method for location information on a social network, comprising:
  obtaining, from each of a set of responding client devices, an intent to provide response to social media requests;
  registering, by at least one computer processor, a mobile application executing on each of the set of responding client devices to obtain passive data from at least one sensory device using a background process;
  receiving, by the at least one computer processor, passive data from the set of responding client devices, wherein users of the responding client devices are not notified of the collection of passive data while passive data is being collected;
  repeatedly refining a passively aggregated dataset by performing automated analysis of the passive data received from the set of responding client devices;
  receiving, from a requesting client device, a request for one or more social media posts, wherein the request:
    includes geo-location information,
    is optional, and
    is made by a user of the requesting client device for a current time;
  notifying a first subset of the responding client devices that are within a geographic area established by the geo-location information of the request, wherein a second subset of the responding client devices that are not within the geographic area are not notified, and wherein the geographic area is not based on a location of the requesting client device;
  receiving, in response to notifying the first subset of the client devices, a set of geographically proximate and temporally recent social media posts based on the geo-location information, wherein the social media posts are made by the responding client devices that are within the geographic area and are made after the request is made by the user of the requesting client device;
  applying, by the at least one computer processor, grouping criteria to the set of social media posts to generate an aggregated group, wherein:
    the aggregated group is a subset of the set of social media posts, and
    applying the grouping criteria comprises:
      identifying, using the passively aggregated dataset and based on the request, a subset of the passive data within the geographic area and associated with the first subset of the responding devices; and
      selecting, based on (i) active data corresponding to each social media post and (ii) a data type of the subset of the passive data within the geographic area, the subset of the set of social media posts for inclusion in the aggregated group, wherein the selecting comprises excluding at least one social media post of the set of social media posts from inclusion in the aggregated group; and
  providing, in response to the request, the aggregated group for display by the requesting client device.

9. The method of claim 8, wherein the geo-location information corresponds to a geographic map displayed on the requesting client device.

10. The method of claim 8, wherein:
the request further includes a set of filter parameters, and
the selecting is further based on the set of filter parameters.

11. The method of claim 10, wherein the set of filter parameters comprises at least one selected from a group consisting of categories, hashtags, mental states, and descriptive adjectives.

12. The method of claim 8, wherein the request comprises a service request.

13. The method of claim 8, wherein active data comprises at least one selected from a group consisting of an audio recording or stream, a video recording or stream, an image, a text submission, a hashtag, a location indication, a mental state indication, an observational state indication, information provided through a form, and information provided through a selection of an option.

14. The method of claim 8, wherein passive data comprises at least one selected from a group consisting of video received from a wearable sensor, captured supplementary data from sensors or input devices, audio received from a wearable microphone, sensed user observations, user location determination by a GPS sensor, accelerometer data, barometer data, temperature data, physiological data, and body signals.

15. A non-transitory computer-readable storage medium comprising a plurality of instructions for location information on a social network, the plurality of instructions configured to execute on at least one computer processor to enable the at least one computer processor to:
obtain, from each of a set of responding client devices, an intent to provide response to social media requests;
register a mobile application executing on each of the set of responding client devices to obtain passive data from at least one sensory device using a background process;
receive passive data from the set of responding client devices, wherein users of the responding client devices are not notified of the collection of passive data while passive data is being collected;
repeatedly refine a passively aggregated dataset by performing automated analysis of the passive data received from the set of responding client devices;
receive, from a requesting client device, a request for one or more social media posts, wherein the request:
includes geo-location information,
is optional, and
is made by a user of the requesting client device for a current time;
notify a first subset of the responding client devices that are within a geographic area established by the geo-location information of the request, wherein a second subset of the responding client devices that are not within the geographic area are not notified, and wherein the geographic area is not based on a location of the requesting client device;
receive, in response to notifying the first subset of the client devices, a set of geographically proximate and temporally recent social media posts based on the geo-location information, wherein the social media posts are made by the responding client devices that are within the geographic area and are made after the request is made by the user of the requesting client device;
apply, by the computer processor, grouping criteria to the set of social media posts to generate an aggregated group, wherein:
the aggregated group is a subset of the set of social media posts, and
applying the grouping criteria comprises:
identifying, using the passively aggregated dataset and based on the request, a subset of the passive data within the geographic area and associated with the first subset of the responding devices; and
selecting, based on (i) active data corresponding to each social media post and (ii) a data type of the subset of the passive data within the geographic area, the subset of the set of social media posts for inclusion in the aggregated group, wherein the selecting comprises excluding at least one social media post of the set of social media posts from inclusion in the aggregated group; and
provide, in response to the request, the aggregated group for display by the requesting client device.

16. The non-transitory computer-readable storage medium of claim 15, wherein:
the request further includes a set of filter parameters, and
the selecting is further based on the set of filter parameters.

17. The non-transitory computer-readable storage medium of claim 15, wherein the request comprises a service request.

* * * * *